United States Patent
Krumhansl et al.

(10) Patent No.: US 8,708,422 B1
(45) Date of Patent: Apr. 29, 2014

(54) INHERENTLY SAFE IN SITU URANIUM RECOVERY

(75) Inventors: James L. Krumhansl, Albuquerque, NM (US); Patrick V. Brady, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 146 days.

(21) Appl. No.: 13/084,391

(22) Filed: Apr. 11, 2011

Related U.S. Application Data (60) Provisional application No. 61/327,787, filed on Apr. 26, 2010.

(51) Int. Cl.
| | | |
|---|---|---|
| *E21B 43/28* | (2006.01) | |
| *E21C 41/16* | (2006.01) | |
| *C01F 13/00* | (2006.01) | |
| *C01F 15/00* | (2006.01) | |
| *C01G 43/00* | (2006.01) | |
| *C01G 56/00* | (2006.01) | |
| *B01D 11/00* | (2006.01) | |
| *B01F 1/00* | (2006.01) | |
| *C22B 60/02* | (2006.01) | |
| *C02F 1/00* | (2006.01) | |
| *C02F 1/68* | (2006.01) | |
| *E02B 15/00* | (2006.01) | |

(52) U.S. Cl.
USPC ....... 299/5; 210/747.1; 210/749; 210/170.01; 210/170.04; 210/912; 423/2; 423/18

(58) Field of Classification Search
None
See application file for complete search history.

(56) References Cited

U.S. PATENT DOCUMENTS

| | | | |
|---|---|---|---|
| 4,108,722 A | | 8/1978 | Stover |
| 4,134,618 A | | 1/1979 | Kossack |
| 4,234,231 A | * | 11/1980 | Yan .................................. 299/4 |
| 4,270,802 A | | 6/1981 | Grant et al. |
| 4,344,923 A | | 8/1982 | Martin |
| 4,414,183 A | * | 11/1983 | Sasaki et al. ...................... 423/7 |
| 4,464,345 A | | 8/1984 | Yan |
| 4,475,772 A | | 10/1984 | Jan |
| 4,489,042 A | * | 12/1984 | Savins et al. .................... 423/20 |
| 4,582,688 A | * | 4/1986 | Venkatesan ..................... 423/17 |
| 5,324,491 A | | 6/1994 | Lovley |
| 7,294,271 B1 | | 11/2007 | Huffman et al. |
| 7,514,493 B1 | * | 4/2009 | Moore et al. .................. 524/457 |

OTHER PUBLICATIONS

Van Loon, L. R., et al. "Sorption of Isosaccharinic Acid, a Cellulose Degradation Product, on Cement", Environ. Sci. Technol., 1997, 31, 1243-1245, ACS Publications.*

(Continued)

*Primary Examiner* — Nam Nguyen
*Assistant Examiner* — Clare Perrin
(74) *Attorney, Agent, or Firm* — Daniel J. Jenkins (57) ABSTRACT

An in situ recovery of uranium operation involves circulating reactive fluids through an underground uranium deposit. These fluids contain chemicals that dissolve the uranium ore. Uranium is recovered from the fluids after they are pumped back to the surface. Chemicals used to accomplish this include complexing agents that are organic, readily degradable, and/or have a predictable lifetime in an aquifer. Efficiency is increased through development of organic agents targeted to complexing tetravalent uranium rather than hexavalent uranium. The operation provides for in situ immobilization of some oxy-anion pollutants under oxidizing conditions as well as reducing conditions. The operation also artificially reestablishes reducing conditions on the aquifer after uranium recovery is completed. With the ability to have the impacted aquifer reliably remediated, the uranium recovery operation can be considered inherently safe.

13 Claims, 2 Drawing Sheets

(56) References Cited

OTHER PUBLICATIONS

Cho, Herman, et al. "Acidity and Structure of Isosaccharinate in Aqueous Solution: A Nuclear Magnetic Resonance Study", J. Solution Chem., 2003, 32, 691-702, Plenum Publishing Corporation.*

Vercammen, Karlien, et al. "Complexation of Calcium by alpha-Isosaccharinic Acid under Alkaline Conditions", Acta Chemica Scandinavia, 1999, 53, 241-246.*

Cho, et al. "Acidity and Structure of Isosaccharinate in Aqueous Solution: A Nuclear Magentic Resonance Study", Journal of Solution Chemistry, 2003, 32, 691-702, Plenum Publishing Corporation.*

Vercammen, et al. "Complexation of Calcium by alpha-Isosaccharinic Acid under Alkaline Conditions", Acta Chemica Scandinavia, 1999, 53, 241-246.*

Van Loon, et al. "Sorption of Isosaccharinic Acid, a Cellulose Degradation Product, on Cement", Environmental Science and Technology, 1997, 31, 1243-1245, American Chemical Society.*

Cho, et al. "Acidity and Structure of Isosaccharinate in Aqueous Solution: A Nuclear Magnetic Resonance Study", Journal of Solution Chemistry, 2003, 32, 691-702, Plenum Publishing Corporation.*

Vercammen, et al. "Complexation of Calcium by alpha-Isosaccharinic Acid under Alkaline Conditions", Acta Chemica Scandinavica, 1999, 53, 241-246.*

Erskine, et al., "Finding Benchmarks at Uranium Mine Sites", Southwest Hydrology, v.7(6), 2008, pp. 24-25.

Holen, et al., "Geological Characterization of New Mexico Uranium Deposits for Extraction by In Situ Leach Recovery", New Mexico Bureau of Mines and Mineral Resources Open File Report No. 251, 1986, pp. 1-95.

Hovorka, et al., "Sequestration of Greenhouse Gases in Brine Formations; Texas Bureau of Economic Geology", Retrieved at <<http://www.beg.utexas.edu/environqlty/co2seq/dispslsaln.htm>>, 2000, p. 1.

Pelizza, M.S. "In Situ Recovery of Uranium", Southwest Hydrology, v.7(6), 2008, pp. 28-29 & 34.

Schoeppner, J., "Groundwater Remediation from Uranium Mining in New Mexico", Southwest Hydrology, v.7(6), 2008, pp. 22-23 & 34.

Taylor, et al., "Review of Environmental Impacts of the Acid in situ Leach Uranium Mining Process", CSIRO Land and Water Client Report, Aug. 2004, pp. 1-67.

Zelt, et al., "Environmental Setting of the Yellowstone River Basin, Montana, North Dakota, and Wyoming," Water-Resources Investigations Report 98-4269, Retrieved at <<http://pubs.usgs.gov/wri/wri984269/gwater.html>>, 1999, pp. 1-5.

Warwick, et al., "Stability Constants of Uranium(IV)-Alpha-Isosaccharinic Acid and Gluconic Acid Complexes", Radiochimica Acta, v. 92, part 12, 2004, pp. 897-902.

Nyavor, et al., "Control of Pyrite Oxidation by Phosphate Coating", The Science of the Total Environment, v. 162(2), Jan. 1995, pp. 225-237.

* cited by examiner

FIG. 1

$$UO_2 + 2 H_2O + ISA \rightarrow U(ISA)(OH)_4.$$

FIG. 2

$$UO_2 + 1/2 O_2 + 2H^+ \rightarrow UO2^{2+} + H_2O.$$

FIG. 3

CHEMICAL REACTIONS REMOVING MOLYBDATE POLLUTANT FROM SOLUTION BY REDUCTION:

$$3MoO_4^{2-} + 4H_2O + 2e^- \; Mo_3O_8 + 8OH^-$$

IF REDUCED SULFIDE IS ALREADY PRESENT, OR INTRODUCED, THEN THE REACTION MAY BE $$MoO_4^{2-} + 2HS^- + 2e^- + 6H^+ \; MoS_2 + 4H_2O$$

FIG. 4

CHEMICAL REACTIONS REMOVING ARSENIC POLLUTANT BY REDUCTION:

$Fe^{++} + H_2AsO_4^- + HS^- + 5e^- + 3H^+ \rightarrow 2OH^- + 2H_2O + FeAsS$ (note this presumes that the fluid already contains $Fe^{++}$ and $HS^-$, otherwise they would also have to be added).

In the absence of reduced sulfur species one gets:

$Fe^{++} + 2 H_2AsO_4^- + 12e^- + 4H_2O \rightarrow FeAs_2 + 12OH^-$

In the absence of iron one gets:
$H_2AsO_4^- + 5e^- + 3H^+ \rightarrow 2OH^- + 2H_2O + As(metal)$

FIG. 5

CHEMICAL REACTIONS REMOVING SELENIUM POLLUTANT BY REDUCTION:

$HSeO_4^- + 7H^+ + 6e^- \rightarrow Se(metal) + 4H_2O$

If $Fe^{++}$ is present one can also get ferroselite:
$2HSeO_4^- + Fe^{++} + 14H^+ + 14e^- \rightarrow FeSe_2 + 8H_2O$

FIG. 6

CHEMICAL REACTION REMOVING VANADIUM POLLUTANT BY REDUCTION:
$H_2VO_4^- + 4e^- + 6H^+ \rightarrow V_2O_3 + 5H_2O$

FIG. 7

CHEMICAL REACTION REMOVING VANADIUM POLLUTANT BY REDUCTION:
$UO_2(CO_3)_2^{2-} + 2e^- + 2H^+ \rightarrow UO_2 + 2HCO_3^-$

FIG. 8

INHERENTLY SAFE IN SITU URANIUM RECOVERY

CROSS REFERENCE TO RELATED APPLICATION

This application claims the benefit of U.S. Provisional Patent Application Ser. No. 61/327,787, filed Apr. 26, 2010, and entitled "INHERENTLY SAFE IN SITU URANIUM RECOVERY", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A sharp increase in the price of uranium can spark a renewed interest in uranium mining around the world. Most of the (non-stockpiled) uranium to be consumed in nuclear reactors in the United States presently comes from foreign sources, which reflects that the most inexpensively produced highest grade uranium deposits lay outside the United States. In a free market economy these imports from foreign sources will remain important. Therefore, it would be wise planning to build a "buffer" mechanism into the nuclear energy strategy to minimize the impact of foreign uranium suppliers on the United States economy.

The United States fortunately has significant indigenous uranium deposits, especially in the western part of the country. These deposits may be developed to provide a steady feed of domestic uranium or be held in readiness as a stopgap measure against adverse policies initiated by foreign uranium suppliers. However, earlier "uranium booms" in the United States have left a legacy of cultural and environmental concerns with some stakeholders who would be most directly impacted by a resurgence of uranium mining in (or near) their communities.

In situ recovery ("ISR") of uranium is a technique that allows for uranium extraction while avoiding many of the environmental impacts of other mining activities. In principal, ISR entails circulating a uranium-leaching fluid down one well into an underground ore deposit, and then bringing the fluid back to the surface through a second well (or array of wells). A chemical treatment plant is located at the site to recover the uranium from the fluid. The only waste that cannot be removed when the site closes is in the residual fluid left underground in the aquifer.

Groundwater resources in the desert southwest of the United States are a matter of ever increasing importance to stakeholders, communities, and regulators. Consequently, being able to demonstrate that an ISR-impacted aquifer could be reliably remediated (restored) may be a factor in being allowed initial set up of ISR activity adjacent to a community. Additionally, technology advances which can improve the efficiency of the uranium extraction process would be viewed favorably by the mining industry.

OBJECTS OF EXEMPLARY EMBODIMENTS

The following is a listing of objects of various exemplary embodiments. The below-listed objects are not intended to be limiting as to the scope of the claims.

It is an object of an exemplary embodiment to provide contributions to improving both the public acceptance and efficiency of ISR of uranium.

It is a further object of an exemplary embodiment to be able to predict and manipulate the mobility of uranium (as well as other radio nuclides) in the subsurface.

It is a further object of an exemplary embodiment to improve the efficiency of uranium removal.

It is a further object of an exemplary embodiment to make it easier to remediate an aquifer once the uranium ore body is exhausted.

It is a further object of an exemplary embodiment to provide more efficient uranium recovery complexing agents.

It is a further object of an exemplary embodiment to provide readily degradable complexing agents.

It is a further object of an exemplary embodiment to provide complexing agents that could be substituted for carbonate, and would have a finite predictable lifetime in an aquifer.

It is a further object of an exemplary embodiment to provide reduction (e.g., lower the oxidation state) of ISR pollutants dissolved as oxy-anions back to their initial (insoluble) condition at a predictable rate.

It is a further object of an exemplary embodiment to identify chemicals that would suppress the liberation of ISR pollutants without interfering with the removal of uranium.

It is a further object of an exemplary embodiment to identify additives that would suppress oxidation of some constituents in the formation (such as pyrite and other sulfide minerals) while still allowing uranium-containing minerals to be dissolved.

It is a further object of an exemplary embodiment to provide novel computational and modeling frameworks to immobilize constituents like selenate, molybdate and vanadate under oxidizing conditions.

It is a further object of an exemplary embodiment to improve the performance of fluid used to dissolve and transport uranium, and foster the use of more environmentally friendly approaches to in situ uranium mining.

It is a further object of an exemplary embodiment to restore an underground reservoir following solution mining of uranium from a subterranean deposit formation.

It is a further object of an exemplary embodiment to restore an aquifer involved with in situ uranium mining to meet or exceed a maximum of 30 ppb uranium during post-extraction aquifer remediation activities.

It is a further object of an exemplary embodiment to introduce $Fe^{++}$, $Mn^{++}$, $H_3PO_2$, $H_3PO_3$, $S_2O_6^=$, $HS_2O_4^-$, $H_2SO_3$, HCOOH, $COOH^-$, Citrate, etc. to reestablish reducing conditions in an underground aquifer that was subject to uranium mining.

It is a further object of an exemplary embodiment to provide restoration of groundwater in a mineralized sandstone formation subsequent to in situ recovery of uranium.

It is a further object of an exemplary embodiment to allow monitored natural attenuation to site closure processes subsequent to in situ recovery of uranium.

It is a further object of an exemplary embodiment to re-impose reducing conditions on an aquifer once a uranium mining process has been completed in order to predictably restore the aquifer to a condition more favorable for regulatory bodies to agree to final site closure plans.

Further objects of exemplary embodiments will be made apparent in the following Detailed Description.

DETAILED DESCRIPTION

Various technologies pertaining to in situ uranium recovery (ISR) will now be described with reference to the drawings, where like reference numerals represent like elements throughout. It is to be understood that the term "exemplary", as used herein, is defined as serving as an illustration or example, and is not intended to indicate a preference.

Expansion of uranium mining in the United States is a concern to some environmental groups and sovereign Native American Nations. An approach which may alleviate such concerns is to develop inherently safe in situ recovery ("ISISR") of uranium technologies. Current ISR technology relies on chemical extraction of trace levels of uranium from aquifers. However, after the mining operation the aquifers can still contain dissolved uranium and other trace metals that may be a health concern.

Existing ISR operations may be few in number but higher uranium prices could drive the industry to consider expanding operations nationwide. Environmental concerns and enforcement of the new drinking water standard with 30 ppb uranium may make opening new uranium mining operations more difficult and costly.

It is an object of an exemplary embodiment to propose technological advances which provide ISISR methods. Features of an exemplary ISISR approach described herein include: (1) new "green" leachants that break down predictably in the subsurface, leaving uranium and associated trace metals in an immobile form; (2) post-leachant uranium/metals-immobilizing washes that provide a backup decontamination process; (3) a well-field design that increases uranium recovery efficiency and minimizes excursions of contaminated water; and (4) a hydrologic and/or (5) geochemical protocol for low-cost post-extraction long-term monitoring. The exemplary ISISR brings larger amounts of uranium to the surface when compared to conventional ISR techniques, leave fewer dissolved toxic metals in the aquifer when compared to conventional ISR techniques, and cost less to safely monitor when compared to conventional ISR techniques.

For a better understanding of the objects of exemplary embodiments, the origin and characteristics of some uranium deposit types will now be discussed. Uranium deposits can be broadly divided into two general categories: (1) those of hydrothermal origin; and (2) those hosted in sedimentary rocks (principally sandstones) which show no evidence of having originated at elevated temperatures. Hydrothermal uranium deposits are similar to the more traditionally recognized "vein" deposits of copper, silver, lead, gold, etc. In these vein types of deposits the metals were deposited from hot (often saline) fluids, heated by the emplacement of igneous (typically granitic) rocks. Uranium vein deposits have a limited occurrence in the United States. Hence, such uranium vein deposits will likely not play an immediate role in the expansion of uranium mining in the near future in the United States.

Sandstone-hosted uranium deposits (which may also be variously referred to as "roll-front" and "channel deposits") are widely distributed in Mesozoic and Tertiary rocks across the western section of the United States. These types of uranium deposits have already supplied significant amounts of uranium for both civilian and military applications. The deposits formed where ground waters moved along ancient buried stream channels (or other high porosity sedimentary structures) and encountered localized concentrations of organic matter, hydrogen sulfide or pyrite, which created reducing conditions and precipitated minerals such as pitchblende (A.K.A. uraninite, $UO_2.UO_3$) and coffinite (U $(SiO_4)_{1-x}(OH)_{4x}$). Pitchblende usually contains 55-75% $UO_2$, up to 30% $UO_3$, a little water, and varying amounts of other elements. Thorium and the rare earths are generally absent.

These types of uranium deposits are much younger than the rock units which host them. The fluids responsible for their origin may have originated in rather distant deep hydrothermal systems which cooled and mixed with normal ground waters prior to forming the ore body. Alternatively, these types of deposits may have also originated when normal ground waters acquired trace amounts of uranium from the vast amounts of weathering volcanic ash they encountered while infiltrating into proximate sedimentary units.

Precambrian "unconformity" deposits were probably formed by processes similar to those that formed the younger sandstone-hosted deposits. That is, they are typically found where uranium enriched ground waters apparently percolated along discontinuities between ancient Precambrian crystalline basement complexes (Archean and early Proterozoic age) and thick overlying accumulations of younger (mid-Proterozoic) sandstones, which later suffered metamorphism causing the exact details of how the ore bodies formed to be obscured. These deposits are confined to the Precambrian shields (notably in Canada) and may have ore grades in the tens of percent range, unlike the sandstone deposits in the United States which have ore grades of a fraction of one percent uranium.

As previously mentioned, in situ recovery is a mining practice that avoids the expense and environmental implications of traditional mining practices, which can include underground or open pit works. ISR of uranium involves circulating reactive fluids through an underground uranium deposit. The fluids containing chemical agents (referred to as "lixiviant") are introduced into a mineralized aquifer to dissolve the uranium ore. Uranium-laden formation water is then pumped back to the surface, which allows the uranium to be recovered at an on-site chemical processing plant. Table 1 shows a uranium-rich lixiviant water chemistry (Air-$CO_2$—$NaHCO_3$ type leach).

TABLE 1

| Constituent | Typical Concentration Range |
|---|---|
| Calcium | 100-350 mg/l |
| Magnesium | 10-50 mg/l |
| Sodium | 500-1600 mg/l |
| Potassium | 25-250 mg/l |
| Bicarbonate | 0-500 mg/l |
| Sulfate | 100-1,200 mg/l |
| Chloride | 250-1,800 mg/l |
| Silica ($SiO_2$ aq) | 25-50 mg/l |
| Total Dissolved Solids | 1,500-5,500 mg/l |
| Uranium | 50-250 mg/l |
| 226 radium | 500 pCi/l |
| Conductivity | 2,500-7,500 $\Phi$S/cm l |
| pH | 7-9 |

In addition to being an economical method of mining uranium, ISR mining has many environmental benefits. ISR does not involve digging a shaft or running a conventional ore milling operation with tailings piles being left behind. With ISR there are no mine excavations to disturb the site surface, nor any large piles of waste left exposed on the surface. Instead, the principal environmental impact of ISR activity resides underground in the formation from which the uranium was leached.

An ISR well field, in an exemplary embodiment, consists of a network of production and injection wells; as an example one might have an injection well surrounded by four to six recovery (production) wells (5-spot or 7-spot patterns) being 15 to 50 meters away. A goal of the well field arrangement is for all of the lixiviant injected in the injection wells to migrate toward the nearest production well(s), while dissolving uranium and sweeping the entire ore body as it moves. However, the ideal flow pattern rarely develops because of geologic heterogeneity. Preferential flow paths are inherently present, resulting in uranium being left behind in lower permeability sections of the aquifer and undesirable "excursions" of lixiviant occurring beyond the well field. After ISR operations are terminated, tracking and remediation of these excursions can result in a major expense.

In addition to the production well field, ISR operations also require a perimeter of monitoring wells within the ore horizon but beyond the production wells. Monitoring wells can also be in aquifers above and below the ore horizon. The purpose of these monitoring wells is to detect excursions and other unanticipated hydraulic effects of ISR operations.

A concern is the treatment and/or disposal of excess process waters once the uranium has been stripped. Ultimately this problem can be addressed by re-injecting the water underground or by a land surface application after the water has been purified by reverse osmosis (RO) and/or chemical treatment. However, before final disposal becomes an issue this water will likely be re-circulated through the formation numerous times.

Uranium ore dressing processes graduated from an alkali-carbonate-ore roasting technology to a more efficient sulfuric acid leach treatment. The earliest ISR processes in the US were undertaken at a time when sulfuric acid was used for traditional ore dressing, so sulfuric acid was one of the first reagents tried for ISR. The extremely low pH produced by the acid was often all that was needed to dissolve the uranium. Occasionally however, oxidants (hydrogen peroxide, sodium chlorate, and occasionally nitrate or nitric acid) were also added to facilitate the ISR process. The sulfuric acid process generally removed between 70% and 90% of the uranium but left aquifers difficult to remediate. Acid leaching was employed to a much greater extent in the former Soviet Block countries and Australia, rather than in North America. Because of its environmental concerns and consequences, it seems unlikely that an ISR approach based on sulfuric acid will be used again in the United States. As an alternative to sulfuric acid, circulating air-saturated solutions containing dissolved ferric iron can also remove economic levels of uranium.

Prior ISR technology depended on coupling oxidation of the uranium ore (initially a mix of U(IV) hydroxide and silicate minerals) along with complexing of the resulting hexavalent uranyl ion ($UO_2^{++}$) with carbonate ion to form soluble $UO_2(CO_3)^{-4}$ in solution. Uranium extraction efficiency could be in the 60-70% range. A chemical combination employed to affect this ISR process is a mix of air and carbon dioxide. Yields increase when hydrogen peroxide or oxygen is substituted for air, and a carbonate or bicarbonate salt is substituted for carbon dioxide. A limitation on this latter carbon dioxide switch is that the uranyl ion forms sparingly soluble salts with most alkali and alkaline earth elements. Consequently, if the formation waters already contain significant dissolved sodium, one may not actually get enhanced leaching by using sodium carbonate since solid sodium uraninite may precipitate. In some instances, ammonium carbonate can be used (rather than sodium carbonate) to avoid this problem. However, ammonium left in the groundwater then presents additional remediation problems. Thus, there are relative benefits and drawbacks of acid and alkaline ISR processes.

The neutral to mildly basic pH established underground by some ISR reagents is far less likely to produce the whole scale heavy metal mobilization caused by acid-wash technologies. However, there remain potential pollution sources. Pollution elements such as selenium, arsenic, vanadium, and molybdenum can still be mobilized by acid-free ISR technologies. These elements, which can be found with the uranium in sandstone-type deposits, can form oxy-anions. Examples of heavy metal oxy-anions are $HAsO_4^=$, $H_2VO_4^-$, $MoO_4^=$, and $HSeO_3^-$. Additionally, with higher drinking water standards moving to 30 ppb U, the residual dissolved uranium itself can be problematic. The uranium-series decay daughter products (notably radium and radon) are another concern since they are hazardous at concentrations which are considerably below levels where mineral precipitation will limit their mobility.

Another concern is that ISR activities may increase the salinity of potential drinking water sources. This is likely to be viewed as an unacceptable development by regulatory agencies charged with protecting potential drinking water sources. This is of particular concern on the Colorado Plateau and in Wyoming where the Morrison and Wind River Formations are both important host formations for ore deposits, because these formations are some of the few regional sources of low salinity water.

An additional concern is organic pollutants. These pollutants may originate as a consequence of the leach fluids interacting with the nominally insoluble organic constituents indigenous to the ore. Alternatively, these pollutants may result because of organic chemicals being added during uranium recovery operations, which are then transported underground when fluids are re-circulated to recover additional uranium. However, at present such constituents have not constituted a significant pollution concern.

It is an object of an exemplary embodiment to provide chemistry-based improvements to ISR processes for uranium. The exemplary technique uses non-standard chemistry to target the extraction of uranium minerals while also providing environmentally friendly approaches that do not liberate oxy-anions or heavy metals. The exemplary technique also includes an ability to predict and/or manipulate the mobility of uranium (as well as other radio nuclides) in the subsurface.

Approaches include improving chemical processes and/or better application of hydrologic principals, although occasional cross over issues may be encountered. For example, carbonaceous constituents in the ore may have a detrimental impact on ISR technologies. Unlike the ores of Texas and Wyoming (where most of the organic content exists as fragments of lignin-like material) the porosity in some of New Mexico's highest grade ores may be plugged by a degraded, insoluble, kerogen like material called "humate." In one sense the problem is mechanical because the leach fluids simply cannot reach most of the uranium. An exemplary ability to develop such deposits economically lies in better hydrologic models that increase access to what uranium is still available and/or use of novel surfactants that allow the leach solution to access the coffinite/pitchblende which is sequestered beneath the organic coatings.

In the realm of chemical approaches, the exemplary technique provides the benefits of increased efficiency of uranium removal and ease of remediating an aquifer after the uranium ore was exhausted. Novel aspects leading to these benefits will now be discussed in greater detail.

An exemplary novel advance is directed to improving the chemical agents used to extract uranium ore during ISR operations. These improvements target the performance of fluid used to dissolve and transport uranium, and foster the use of more environmentally friendly approaches to in situ uranium mining. As a result, better complexing agents can now be used.

As already mentioned, some ISR uranium mining techniques employ a mixture of air and carbon dioxide to dissolve the uranium minerals in the formation. This is a two step process. Again, uranium ore is primarily made up of the two minerals pitchblende and coffinite, both of which contain tetravalent uranium. In the first step the tetravalent uranium is oxidized to hexavalent uranium, which forms the sparingly soluble $UO_2^{++}$ ion. This oxidation equation can be expressed as $UO_2 + 1/2 O_2 + 2H^+ \rightarrow UO2^{++} + H_2O$. The next (second) step is to complex the $UO_2^{++}$ ion with carbonate so that the fluid pumped out of the ground can contain high concentrations of uranium.

The uranyl carbonate complex is both strong and inexpensive to produce. However, other complexes (such as citrate or EDTA) are also efficiently applicable in settings where current technologies leave behind too much of the uranium. The exemplary embodiment includes development of complexing agents that are both specific to uranium and capable of complexing uranium in its tetravalent form. That is, a series of organic complexing agents have been identified which not only bond strongly to uranium, but also complex tetravalent uranium rather than hexavalent uranium.

In particular, catechol derivatives, isosaccharinic acid (ISA), and gluconic acid (and complexing agents with related structures) have these complexing abilities. Catechol has a preference for higher-valent metals: $Th^{+4} > UO_2$. Catechol can provide a significant advance in leaching ores rich in coffinite without oxidation or mobilizing divalent metals since it will complex both uranyl and silica. Ca-ISA can be made by boiling a solution of lime and lactose-monohydrate. Thus, ISA is a low cost option for putting $U^{+4}$ into solution while maintaining a reducing environment.

Figure 1:
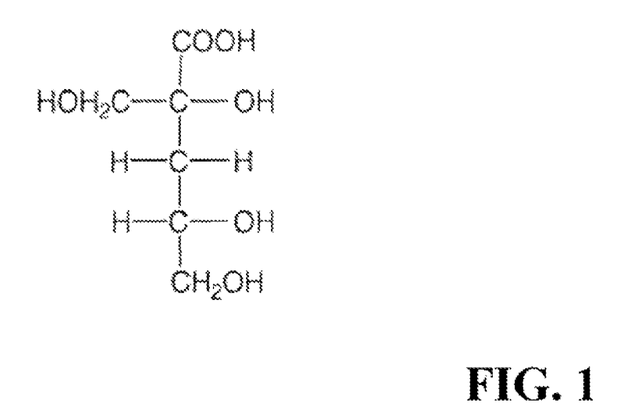
FIG. 1 illustrates a chemical diagram of isosaccharinic acid.
Figure 2:
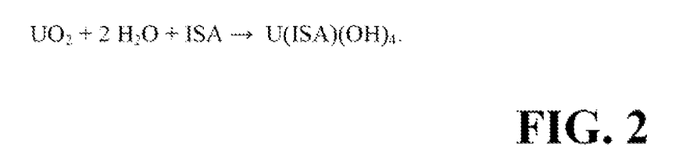
FIG. 2 illustrates a chemical reaction for dissolution of a uranium (IV) mineral in Isosaccharinic acid.
Figure 3:
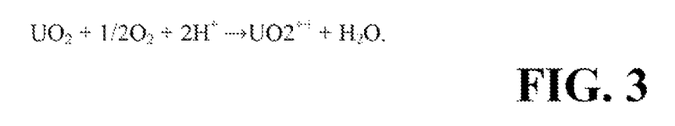
FIG. 3 illustrates an exemplary chemical reaction which uses organic complexing agents that target uranium in its tetravalent form rather than hexavalent uranium.
Figure 4:
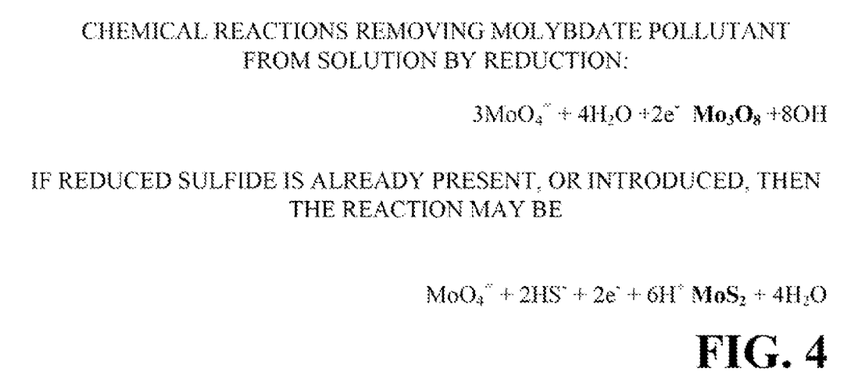
FIGS. 4-8 show examples of chemical reactions that use reduction for removing pollutants that may be caused by ISR of uranium.
Figure 5:
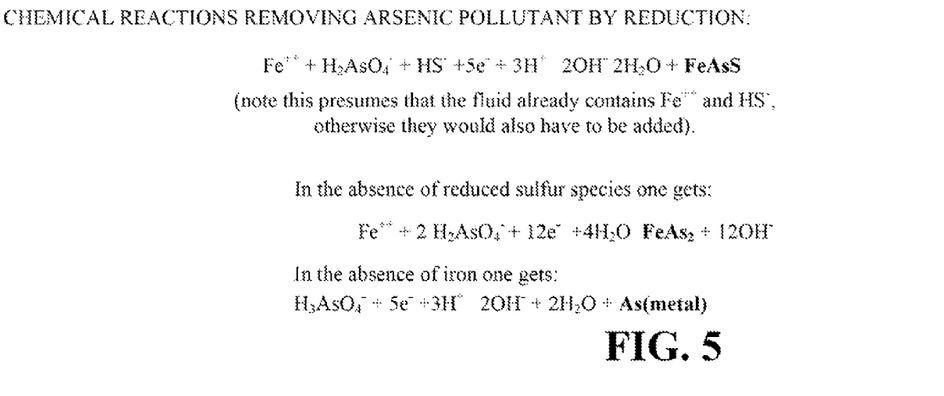
Figure 6:
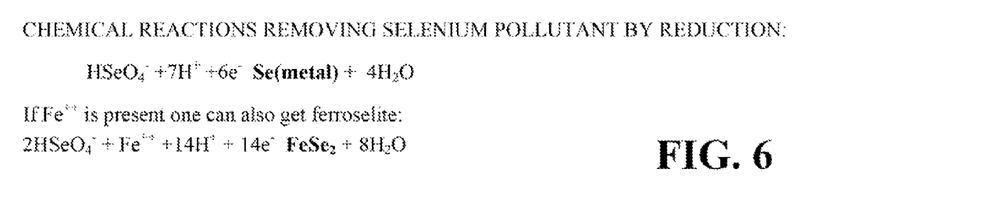
Figure 7:
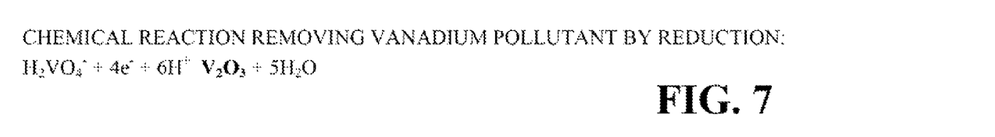
Figure 8:
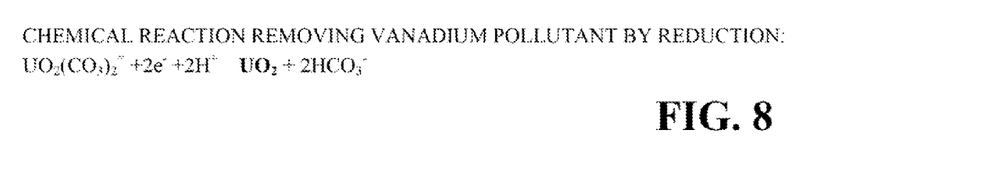

FIG. 1 shows examples of chemical reactions for the complexing of uranium in its tetravalent form with regard to ISR. ISA is shown complexing tetravalent uranium. Gluconic acid is also shown complexing tetravalent uranium.

Using these exemplary complexing agents may improve the ISR process in at least two ways. First, a limitation on the efficiency of prior uranium removal was the amount of air which would dissolve in the water being sent down a well. The exemplary technique resolves this air problem by removing the need to oxidize the uranium prior to its removal.

Second, prior ISR processes would oxidize not only the uranium-containing minerals, but also a host of other constituents in the ore. This oxidizing in turn would allow a variety of undesirable pollutants (As, Se, Mo, V, Pb, etc.) to dissolve in the ground waters. These pollutants remained dissolved in the water once the ore body had been extracted. The pollutants could be a major problem (and source of considerable expense) when it came to remediating the site prior to getting final regulatory (e.g., Environmental Protection Agency "EPA") approval for site closure. The exemplary process allows these pollutants to remain sequestered in the minerals indigenous to the formation, thereby greatly decreasing the cost associated with site closure.

With the developed exemplary complexing agents, extracting the uranium will no longer depend on imposing an oxidizing condition on the formation. As a result, the many previously noted potential pollutants (As, Se, V, Mo) would not form oxy-anions (like in prior ISR practices). Thus, these potential pollutants would remain fixed in indigenous minerals rather than be mobilized into the groundwater.

Another exemplary technique is directed to providing readily degradable complexing agents for use with prior ISR processes in which tetravalent uranium is oxidized to hexavalent uranium, which forms the sparingly soluble $UO_2^{++}$ ion. As previously discussed, ISR fluids containing oxygen and carbonate can play important roles in mobilizing the uranium. Carbonate can also be used to complex the $UO_2^{++}$ ion so that the fluid being recovered will have greater uranium concentrations, but it does not degrade over time like the organic complexing agents discussed in this example. The exemplary process for ISR of uranium includes use of complexing agents that have been developed to degrade quickly, degrade by predictable mechanisms, and degrade producing innocuous chemicals.

No ore extraction process is 100% efficient, so this carbonate (or bicarbonate) will unfortunately continue to dissolve traces of uranium remaining in the ore long after mining operations have ceased. Carbonate does not degrade rapidly, so it will persist indefinitely in ground waters remaining in exhausted ore bodies. That is, once the ore has been extracted, the remaining carbonate that was introduced into the subsurface lasts for a very long period of time, while continuing to solubilize some uranium. The result can be long term elevation of dissolved uranium concentrations. It is thus to be understood that use of carbonates in ISR makes it difficult to restore an aquifer to a condition where the EPA will approve final site closure. This long term problem also makes it difficult (and expensive) to advocate for monitored natural attenuation as a closure processes, since monitoring times would be inherently very long and outcomes uncertain.

The exemplary embodiment provides a technological advance that removes this problem by developing complexing agents which can be substituted for carbonate. Furthermore, these new materials have a finite, predictable lifetime in an aquifer. That is, the exemplary technique provides a number of complexing agents novel to ISR activity which equal or exceed the ability of carbonate to complex uranium, yet would not persist indefinitely in natural aquifers.

The exemplary complexing agents limit the time during which uranium would remain mobile. Organic acid anions (citrate, oxalate, EDTA, etc.) have the ability to complex uranium, yet be susceptible to breakdown in natural settings. Isosaccharinic acid (USA), and catechol also meets the criteria. Biodegradation is rapid with only typical metabolic products being produced (e.g., water, $CO_2$, pH shifts). For example, citrate degrades when exposed to excess oxidizing agents.

The breakdown additionally may occur because indigenous microbial populations typically find that they can use these compounds as food, which causes them to be quickly metabolized. Therefore, in addition to finding complexing agents that can be substituted for carbonate and significantly mitigate long-term uranium mobility, the exemplary embodiment also makes it possible to artificially stimulate microbial activity in such a setting to assure that the complexing agents, and hence the initial causative agent for uranium mobility, would disappear in a predictable time frame.

The exemplary embodiment also provides for (at the end of the mining operation) flooding the formation with a chemical agent which would render the complexing agent impotent.

The exemplary chemical agent has a stronger affinity for the complexing agent than does the uranium. Alternatively, an exemplary agent can be chemically reactive to break down the complexing agent.

Thus, the exemplary embodiment allows for a uranium complexing agent other then carbonate to be used in a uranium ISR process. It further allows for the effectiveness of this substitute constituent to be controlled (destroyed) in a predictable manner. It also provides for use of uranium complexing agents which, over time, would degrade by use of bacterial agents or degrade as a consequence of injecting a second reagent. The exemplary technique also provides for including a mixture of additives designed to stimulate microbial activity. As a result, the exemplary complexing agents function to lower long-term residual dissolved uranium concentrations to levels acceptable to regulators. Benefits are provided to both the uranium mining industry and communities proximate to uranium mining operations.

Another exemplary technique is directed to providing chemicals that do not interfere with the removal of uranium, yet suppress the liberation of pollutants. Aside from suppressing the oxidization of the indigenous pollutant-containing minerals and having the principal complexant decay with time, the exemplary technique targets the specific chemistries of various pollutants.

ISR uranium mining dissolves the uranium minerals in the formation. Unfortunately, other components in the formation can also be oxidized and may become soluble pollutants. Arsenate and selenate are prominent in many studies of groundwater pollution in the southwest area of the United States. Other constituents like molybdate and vanadate can also be present.

It may not always be possible to re-impose the reducing conditions underground that would be needed to precipitate these pollution components. Alternate exemplary technologies that allow operation under oxidizing conditions include the use of novel computational and modeling frameworks to immobilize these constituents under oxidizing conditions.

$AsO_{3(or\ 4)}^{-3}$, $SeO_{3(or\ 4)}^{=}$, $VO_4^{-3}$ and $MoO_4^{=}$ fall into a geochemical grouping known as oxy-anions and exhibit broadly similar behaviors in groundwater systems. The exemplary embodiment provides for in-situ treatment of oxy-anion pollutants under oxidizing conditions. The exemplary processes limit the aqueous mobility of oxy-anions to keep these constituents out of the leach fluids employed to extract uranium during ISR operations. An exemplary set of additives has been developed which, when put in leach solutions, either suppress the liberation of these components during active mining operations or remove them at a time when ISR operations are to be concluded. Table 2 shows some of the reducing agents which may be added to precipitate ISR pollutants by serving as a source of electrons.

TABLE 2

$Fe^{++} | Fe^{+++} + e^-$
$H_3PO_2 + H_2O | H_3PO_3 + 2H^+ + 2e^-$
$H_3PO_3 + H_2O | H_4PO_3 + 2H^+ + 2e^-$
$H_2O + S_2O_6^= | 2SO_4^= + 4H^+ + 2e^-$
$HS_2O_4^- + 2H_2O | 2H_2SO^3 + H^+ + 2e^-$
$H_2SO_3 + H_2O | SO_4^= + 4H^+ + 2e^-$
$HS^- | S(solid) + 2e^- + H^+$
$HCOOH(aq) | CO_2 + 2H^+ + 2e^-$ A first aspect of the exemplary embodiment relates to employing the unique solubility properties of oxy-anion containing natural minerals for keeping/removing these components from contaminated waters. Calcium molybdate, calcium (and other cation) copper arsenates, and a host of members of the apatite group of minerals [$(Ca, Pb, Ba)_5 (PO_4, VO_4, AsO_4, SeO_4)_3 (Cl, OH, F)$], all occur as insoluble residues in and around localities where nature has leached ores of these minerals for prolonged periods of time. The natural occurrence of these minerals supports their use in treating contaminated ground waters. The exemplary technique enables precipitation of the relevant phases to be caused by adding excess amounts of environmentally benign constituents, such as calcium and phosphate. Additionally, it allows for geochemical reaction path modeling to be used to address performance as a function of site-specific changes in groundwater chemistry. In conjunction with various additives, the exemplary chemicals can be used to form a host of sparingly soluble phases such as the mentioned calcium molybdate, calcium copper arsenate, and the apatite group minerals.

Exemplary chemical reactions are used to remove pollutants by reduction. FIGS. 2-7 show reactions that consume electrons "$e^-$" and produce low solubility solids containing the pollutants (shown in bold type). It should be noted that in this discussion, iron ($Fe^{++}$) serves as a proxy for other divalent metals such as $Pb^{++}$, $Cd^{++}$, $Ni^{++}$, etc. which are potentially metallic pollutants, and which could be immobilized by reactions having the same formulas as those where iron appears.

It should also be noted that the selection of which particular reducing agent(s) to use to precipitate a particular pollutant would be based on site-specific criteria. Any matching of an electron source reaction with an electron sink reaction requires that the same number of electrons appear on both sides of the net reaction equation. For example, the reduction of molybdate with formate: $3MoO_4^= + 4H_2O + 2e^- | Mo_3O_8^= + 8OH^- + HCOOH(aq) | CO_2 + +2e^-$ results in: $3MoO_4^= + 2H_2O + HCOOH(aq) | Mo_3O_8 + 6OH^- + CO_2$.

A second aspect of the exemplary embodiment relates to application of materials to ISR problems. A suite of chemicals is provided which can increase the sorptive properties of many mineral surfaces. The exemplary chemicals are added to remove oxy-anions from solution under oxidizing conditions by surface sorption mechanisms. Bismuth-oxide sorbent materials work well for both selenium and arsenic. Cu—Fe based sorbants have been demonstrated to be effective for arsenic treatment.

Monitored natural attenuation pathways for heavy metal oxy-anions include sorption to iron hydroxides and organic matter, low pH to destabilize the iron hydroxides, and low Eh to dissolve the iron hydroxides. Monitored natural attenuation pathways for $UO_2^{++}$ can include U(VI) sorption to iron hydroxides. Precipitation of sparingly soluble hydroxides and phosphates. Reduction to sparingly soluble valence states. Low pH can be used to destabilize carbonates and iron hydroxides. Commingled organic acids and chelates can decrease sorption. High pH and/or carbonate concentrations also decrease sorption. Low Eh dissolves iron hydroxides but favors reduction.

Besides using these materials to scavenge oxy-anions, they can also be placed underground for in situ aquifer remediation. Additionally, the exemplary embodiment allows for reaction path modeling to be used as a guide in making site-specific adjustments to placement of the materials. The exemplary technique provides multiple approaches to improve site-specific effectiveness of monitored natural attenuation.

A further exemplary technique is directed to providing additives that suppress oxidation of some constituents (e.g., pyrite and other sulfide minerals) in the formation, yet still allow uranium-containing minerals to be oxidized. These minerals host much of the indigenous inventory in the ore of elements which may ultimately appear as dissolved pollutants. Thus, the exemplary embodiment can suppress the dissolution of polluting elements during ISR activities.

An exemplary additive includes phosphate which will significantly slow the rate of (suppress) pyrite oxidation. The phosphate addition may also facilitate leaching of uranium, in accordance with the determination that first dissociation constants (log units) of common inorganic ligands with the uranyl ion indicate increasing stability in the order of fluoride—5.16, sulfate—6.58, carbonate—9.91, and phosphate—13.2.

A concern is that a uranyl phosphate phase may also precipitate. However, the exemplary embodiment also provides for varying the pH and Eh of the system, in addition to manipulating phosphate concentration. A variation includes use of the various organophosphates used in the detergent industry. These organophosphates can be used to passivate sulfide mineral surfaces (with respect to oxidation) while having a negligible impact on uranyl ion solubility.

Thus, the exemplary embodiment significantly reduces the potential for oxy-anion (and other heavy metal) pollutant production during ISR activities, especially when the formation is likely to be most oxidizing. It also allows reaction path geochemical modeling to be used to address local groundwater conditions, as a tool for perfecting the site-specific aspects of the process, and to support regulatory activities directed at implementing these technologies.

Another exemplary technique is directed operations after the mining process has been completed. The exemplary technique is directed to improving site remediation by reducing (e.g., lowering the oxidation state of) pollutants (As, Se, V, Mo, etc.) dissolved as oxy-anions back to their initial (insoluble) condition, especially at a predictable rate. The reducing operation allows an aquifer to be accurately restored to a predicted condition. This predictably enables a regulatory body to approve a site remediation strategy.

As previously discussed, when artificial oxidizing conditions are imposed on the formation during ISR of uranium, additional constituents from the ore can also be mobilized, some as oxy-anions, while other pollutants such as Pb, Cu and Cd can be mobilized because the sulfide in the minerals in which they were immobilized was also oxidized. These constituents remain in solution when mining ceases. Thus, they can constitute an environmental problem that can be very expensive to address.

The exemplary embodiment provides a substrate conducive to accelerating the precipitation reactions by artificially introducing (e.g., injecting) a mixture of various reducing agents. Various sulfide, polysulfide, or thiosulfide ions can be used as the reducing agents. With a formation that initially contained abundant sulfide minerals, these reducing agents would not introduce a new constituent into the formation that would further complicate the job of evaluating the overall environmental impact of the remediation process. That is, since the uranium ore bodies initially contained abundant sulfide minerals introducing additional sulfide would not introduce any new constituents into the environment.

Alternatively, $Fe^{++}$ or $Mn^{++}$ can also be used to reestablish reducing conditions underground. However, with such use the system would then lack the sulfide component needed to re-precipitate some indigenous formation minerals.

As an adjunct to adding iron or manganese, or as a stand-alone activity, the exemplary embodiment also stimulates sulfate-reducing bacteria to feed on the indigenous sulfate in the groundwater. This groundwater sulfate can provide sulfide needed to precipitate insoluble phases from pollutants such as As, Se, V, and Mo. The rates associated with microbially enhanced sulfate reduction and sulfide-species oxidation can be determined. Thus, the exemplary technique also allows for predicting how effectively and rapidly microbial interactions could re-impose reducing conditions on a formation to support site remediation plans.

An exemplary technique directed to hydrogeologic improvements for ISR of uranium will now be discussed. A well planned ISR field can lead to increased efficiency of uranium removal as well as decreased excursions requiring remediation. A well planned monitoring well network increases confidence in excursion detection, while reducing the cost of the network itself.

In the exemplary embodiment, well field management has two primary components: (1) hydrogeologic characterization of the ore body and surrounding rock; and (2) modeling to define the well field operation. The embodiment includes use of hydraulic and tracer testing. This allows for equipment such as a Mobile Integrated Aquifer Testing and Analysis (MIATA) trailer to be used. Specialized well-test and tracer-test analysis codes, such as nSIGHTS and STAMMT-R, can also be used in conjunction with field studies. The MIATA trailer can be equipped with the mechanical and electronic equipment needed to perform a pumping or tracer test, including tests with full pressure (head) providing flow-rate data-acquisition.

Exemplary testing is performed to define a three-dimensional heterogeneous distribution of permeability controlling lixiviant flow movement in the subsurface. An exemplary well test includes observation wells completed in appropriate horizons at appropriate distances. A test duration is assigned that produces adequate interpretable responses. The exemplary test is also based on an understanding of the geologic setting to ensure that heterogeneity is properly characterized. The exemplary test uses a code that can analyze well tests in heterogeneous media, without being based on analytical solutions that require unrealistically ideal conditions or an initial assumption of radial flow to a well. The code also defines uncertainty associated with the parameter estimates it provides.

The tracer testing employed in the exemplary embodiment defines and characterizes the specific pathways by which water moves through a formation. The testing also identifies areas that are not well connected to a pumping well. These can be areas where uranium might be left behind or where the residence time of injected lixiviant may be especially long. The exemplary testing also allows use of the tracer-test-analysis code STAMMT-R, especially in producing estimates of the aquifer properties which control transport of dissolved species.

Information provided by the exemplary testing embodiment allows the set up of a production well field that maximizes uranium extraction. For example, the information provided by the hydraulic and tracer tests allows for identifying and weighting alternative geological conceptual models in inverse groundwater flow model calibration. Thus, the exemplary technique produces test results that can be applied to the specific problems of simulating lixiviant flow for ISR of uranium, minimizing the likelihood of excursions, and predicting excursions that may occur. The probabilistic nature of the exemplary technique can be adapted to specific fluvial stratigraphic systems which host uranium ore bodies amenable to ISR in order to maximize uranium production. The information produced can also include stochastic modeling of subsurface flow and transport, geologic maps, transmissivity maps, geomechanical analysis, landfill cover design and analysis, probabilistic risk-based performance assessment, soil erosion and transport, contaminated sediment transport, and life cycle costs.

The exemplary embodiment can be used to have the risk involved with ISR of uranium quantitatively evaluated by the regulatory bodies. Thus, the exemplary technique can quantify both investment by mining companies and environmental risks by regulatory bodies, such as the Nuclear Regulatory Commission (NRC). As can be seen, the exemplary technique allows creation of a production pattern for an individual ISR site in order to maximize recovery efficiency, minimize environmental impacts, and maximize monitoring.

It should be understood that exemplary embodiments discussed herein may also be combined for use in a single uranium recovery operation. The combinations can further contribute to providing inherently safe in situ recovery of uranium. It should also be understood that although exemplary embodiments have been discussed with regard to in situ mining of uranium and subsequent remediation of the mining site, the exemplary embodiments are also applicable to recovery of other minerals, including precious and rare metals.

Thus the new apparatus, systems, and methods of the exemplary embodiments described achive one or more of the above stated objectives, eliminate difficulties encountered in the use of prior devices and systems, solve problems, and attain desirable results as described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the details shown and described.

In the following claims any feature described as a means for performing a function shall be construed as encompassing any means known to those skilled in the art as being capable of performing the recited function, and shall not be limited to the features shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, and relationships are set forth in the appended claims.

What is claimed is:

1. A method of recovering uranium comprising:
   (a) applying to an underground uranium deposit during an in-situ uranium mining operation, organic complexing agents targeted to tetravalent uranium,
      wherein the organic complexing agents have a significant complexing affinity toward tetravalent uranium, and wherein the applying causes tetravalent uranium to be complexed so that uranium-containing minerals dissolve;
   (b) removing uranium complexed in (a) from the ground, wherein the uranium is removed during the in-situ uranium mining operation prior to any artificially induced oxidation of the underground uranium deposit.

2. The method according to claim 1 wherein in (b) non-oxidized uranium is removed.

3. The method according to claim 1, wherein in (a) the organic complexing agents include at least one of catechol, catechol derivatives, isosaccharinic acids, and gluconic acids.

4. The method according to claim 3, wherein in (a) the underground uranium deposit includes coffinite or uraninite, and wherein in (a) the organic complexing agents includes a catechol derivative.

5. The method according to claim 4, wherein in (b) the uranium is removed prior to any artificially induced mobilization of divalent metals.

6. The method according to claim 1, wherein in (a) the organic complexing agents include an isosaccharinic acid (ISA).

7. The method according to claim 6, further comprising:
   (c) boiling a solution of lime and lactose-monohydrate in making Ca-ISA; wherein in (a) the organic complexing agents include the Ca-ISA made in (c).

8. The method according to claim 1, wherein in (b) the uranium is removed during the mining operation prior to formation of oxy-anions pollutants.

9. The method according to claim 8, wherein the uranium is removed during the mining operation prior to any formation of oxy-anions by As, Se, V, or Mo.

10. The method according to claim 1, wherein in (a) and (b) the in-situ mining operation causes any presence of As, Se, V, and Mo to remain fixed in indigenous minerals without being mobilized.

11. A method of recovering uranium, comprising:
    (a) during an in-situ uranium mining operation, applying organic complexing agents to cause tetravalent uranium in an underground uranium deposit to be complexed;
    (b) removing uranium complexed in (a) from the ground; wherein the uranium is removed during the in-situ uranium mining operation prior to any artificially induced oxidation of the underground uranium deposit.

12. The method according to claim 11, wherein in (a) the organic complexing agents include at least one of catechol, catechol derivatives, isosaccharinic acids, and gluconic acids.

13. The method according to claim 11, wherein (b) includes removing uranium that has not been oxidized.

* * * * *